A. P. HODGE.
WINDING STOP.
APPLICATION FILED MAR. 9, 1916.
1,217,176.
Patented Feb. 27, 1917.
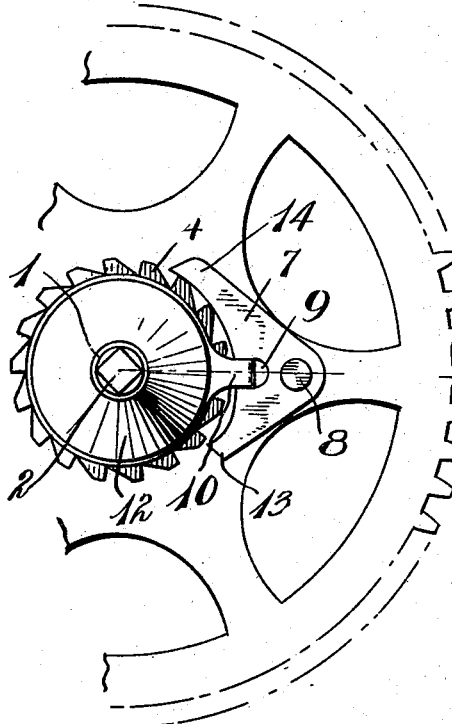
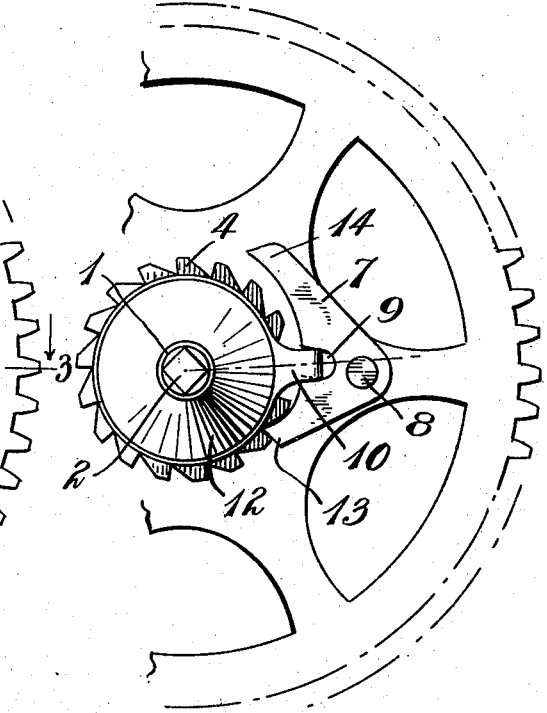
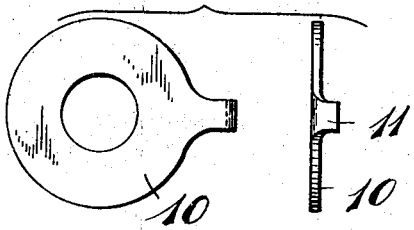
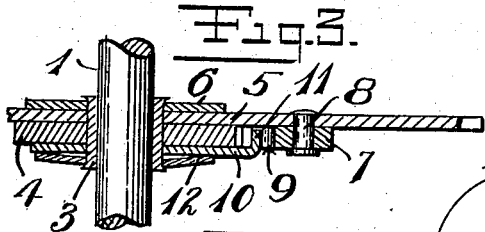
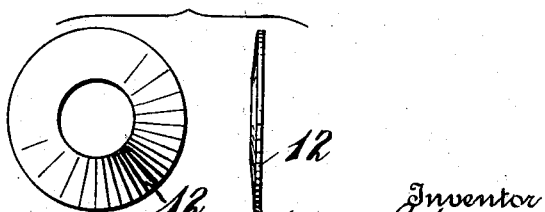

UNITED STATES PATENT OFFICE.

ALBERT P. HODGE, OF WINSTED, CONNECTICUT, ASSIGNOR TO WM. L. GILBERT CLOCK COMPANY, OF WINSTED, CONNECTICUT, A CORPORATION OF CONNECTICUT.

WINDING-STOP.

1,217,176.  Specification of Letters Patent.  Patented Feb. 27, 1917.

Application filed March 9, 1916.  Serial No. 83,063.

*To all whom it may concern:*

Be it known that I, ALBERT P. HODGE, a citizen of the United States, residing at Winsted, Connecticut, have invented certain new and useful Improvements in Winding-Stops, of which the following is a full, clear, and exact description.

My invention relates to improvements in winding stops and has for its object to provide a noiseless stop for winding spring-actuated mechanisms and the like. A further object of my invention is to provide a noiseless stop which shall be positive in its action.

The following is a description of an embodiment of my invention, reference being had to the accompanying drawings, in which, Figure 1 is a side elevation showing the stop in off position;

Fig. 2 is a similar view showing the stop in on position;

Fig. 3 is a section on the dotted line of Fig. 1;

Fig. 4 shows side and end views of a friction member; and

Fig. 5 shows side and end views of a spring washer.

Referring more particularly to the drawings, 1 is a ratchet arbor having a squared end 2, to which an ordinary key or winding crank can be applied. 3 is a bushing secured to said arbor. 4 is an engaged member or ratchet rigidly secured to said bushing. 5 is a gear wheel mounted on said bushing in juxtaposition to said ratchet and free to move relatively thereto. 6 is a washer holding said wheel in place. 7 is a pawl or detaining member secured to said wheel by a pivot 8. This detaining member has a recess 9 preferably located between the pivot 8 and the arbor 1. 10 is a friction member located on the opposite side of the ratchet from the wheel 5 and provided with a nose 11, which projects into the recess 9. 12 is a spring-washer bearing against the friction member 10. The washers 6 and 12 are held upon the bushing 3 by slightly upsetting the ends of the bushing.

The friction washer 12 is preferably rigidly secured to the bushing 3. The friction member 10, however, is free to move upon that bushing except as restrained by the friction due to its contact with the spring washer 12 and the ratchet 4.

The nose 13 of the pawl is adapted to engage the teeth of the ratchet wheel. The pawl has a tail piece 14 providing a surface which engages a suitable limiting surface, in the present instance the crowns of the ratchet teeth, so as to limit the movement of the pawl after its nose has been withdrawn from the path of the ratchet teeth.

The operation of the device is as follows:

When the ratchet arbor 1 is turned in a clockwise direction the friction of the spring washer 12 and the ratchet 4 upon the friction member 10 causes the friction member 10 to move slightly in a clockwise direction. This movement results in causing the pawl 7 to rotate on its pivot 8 until the parts assume the positions shown in Fig. 1, the nose of the pawl being thus raised clear of the teeth on the ratchet. The tail 14 of the pawl engaging the periphery of the ratchet limits the counter-clockwise movement of the pawl. The ratchet can then be turned clockwise through any desired angle, and inasmuch as the nose of the pawl during such turning is withdrawn from the path of the teeth of the ratchet, the turning of the ratchet arbor does not result in any audible sound. When the turning stops and the key on the arbor are released sufficiently to permit the arbor to rotate counter-clockwise, a very slight counter-clockwise movement of the arbor immediately causes the friction member 10 to rotate slightly in a counter-clockwise direction on account of the friction above referred to, causing the pawl to rotate clockwise upon its pivot 8 until the nose 13 is brought into engagement with one of the teeth of the ratchet, as shown in Fig. 2.

In this way a positive stop is provided when the winding is completed and yet during the winding stage the action is noiseless.

While I prefer to make the stop member in the form of a ratchet with projecting teeth and to use a pawl which engages those teeth, my invention relates more particularly to the use of friction for causing the detent member to move relatively to the member engaged and disengaged thereby and permits of various modifications without departing from the spirit thereof or the scope of the appended claims.

What I claim is:

1. In a winding mechanism, the combination of an arbor, a driven member mounted to rotate thereon, a rotating part secured to said arbor and having a periphery adapted to be engaged, a stop member pivotally connected to said driven member and adapted to engage said rotating part, a friction member engaging said stop member at a point eccentric to said pivot, and means carried by said arbor for producing friction between said friction member and a surface positively moved by said arbor, said periphery being provided with ratchet teeth and said stop being provided with a nose adapted to engage the ratchet teeth, said stop member having a surface engaging the crowns of said ratchet teeth during the winding movement of said arbor so as to limit the movement of said stop member.

2. In a winding mechanism, the combination of an arbor, a driven member mounted to rotate thereon, a rotating part secured to said arbor and having a periphery adapted to be engaged, a stop member pivotally connected to said driven member and adapted to engage said rotating part, a friction member, said friction member lying in a plane out of alinement with the plane of said stop member and having a projection extending at an angle and into the plane of said stop member and engaging the same at a point eccentric to its pivot, and means carried by said arbor for producing friction between said friction member and a surface positively moved by said arbor, said periphery being provided with ratchet teeth and said stop being provided with a nose adapted to engage the ratchet teeth, said stop member having a surface engaging the crowns of said ratchet teeth during the winding movement of said arbor so as to limit the movement of said stop member.

3. In a winding mechanism, the combination of an arbor, a driven member mounted to rotate thereon, a rotating part secured to said arbor and having a periphery adapted to be engaged, a stop member pivotally connected to said driven member and adapted to engage said rotating part, a friction member in engagement with said stop member at a point eccentric to said pivot, said stop member and said friction members having their body portions in different planes and one of said members having a portion projecting at an angle thereto into the plane of the other to produce said engagement, and a spring washer carried by said arbor and engaging said friction member at points remote from said arbor for producing friction between said friction member and a surface positively moved by said arbor, said periphery being provided with ratchet teeth and said stop being provided with a nose adapted to engage the ratchet teeth, said stop member having a surface engaging the crowns of said ratchet teeth during the winding movement of said arbor so as to limit the movement of said stop member.

4. In a winding machine, the combination of an arbor, a driven member mounted to rotate thereon, a rotating part secured to said arbor and having teeth upon its periphery adapted to be engaged, a stop member pivotally connected to said pivot member and adapted to engage teeth upon said rotating member, a friction member engaging said stop member at a point eccentric to said pivot, the body of said friction member being in disk form and having its periphery adjacent to said teeth, and a spring washer carried by said arbor for producing friction between said friction member and a surface positively moved by said arbor and engaging said friction member at points adjacent to its periphery and remote from said arbor, said stop being provided with a nose adapted to engage said ratchet teeth and said stop member having a surface engaging the crown of said ratchet teeth during the winding movement of said arbor so as to limit the movement of said stop member.

ALBERT P. HODGE.

Copies of this patent may be obtained for five cents each, by addressing the "Commissioner of Patents, Washington, D. C."